United States Patent Office 3,510,452
Patented May 5, 1970

3,510,452
ANTISTATIC MATERIALS
Herbert Frotscher, Langenfeld, Rhineland, Manfred Petzold, Dusseldorf-Holthausen, Ulrich Rall, Hilden, Rhineland, and Armin Belz, Langenfeld, Rhineland, Germany, assignors to Henkel & Cie, G.m.b.H., Dusseldorf-Holthausen, Germany, a corporation of Germany
No Drawing. Filed Dec. 26, 1967, Ser. No. 693,113
Int. Cl. C08f 11/04
U.S. Cl. 760—46.5                                        7 Claims

ABSTRACT OF THE DISCLOSURE

Hardenable, water-soluble or water-dispersible condensation products containing hydrogen atoms bonded to a nitrogen atom and halohydrin ether groups in a ratio of 1:0.6 to 1:1.5 and containing lipophilic polysiloxane radicals which give textile materials a wash-resistant, dry-cleaning-resistant antistatic finish.

Prior art

It is known to provide textile fabrics with wash-resistant and dry-cleaning-resistant anti-static finishes by treating the said fabric or material with water-soluble, hardenable condensates of polyamines substituted on the nitrogen atoms with polyalkyleneoxide and compounds having more than one epoxide and/or halohydrin groups therein as can be seen from U.S. Pat. No. 3,347,803. However, it has been found that textiles treated with these condensates have the disadvantage of absorbing dirt dispersed in the dry-cleaning solvent, particularly in the presence of small amounts of water and a cleaning-intensifying agent, after a few cleanings thereby causing the material to lose whiteness, i.e., tattletale grayness.

In copending, commonly assigned U.S. patent application Ser. No. 693,077 filed on even date herewith, there are described novel water-soluble or water-dispersible, hardenable condensation or resinous products having hydrogen atoms bonded to an amino nitrogen atom and halohydrin ether groups in a ratio of 6:0.6 to 1:1.5 and containing at least one lipophilic radical of 8 to 22 carbon atoms, said condensation product being formed by reaction at a temperature of about 50 to 120° C. (A) at least one compound selected from the group consisting of ammonia, primary monoamines and polyamines having at least 2 replaceable amino hydrogen atoms and (B) at least one compound selected from the group consisting of di- and/or polyhalohydrin ethers of di- and polyalcohols of 2 to 6 carbon atoms and adducts thereof with 1 to 2 moles of a lower alkylene oxide, at least one of (A) and (B) being at least partially substituted with a lipophilic radical of 8 to 22 carbon atoms. The said condensation products are applied in aqueous solutions or dispersions to textiles and then hardened to obtain textiles having an anti-static finish which is laundry-proof and dry-cleaning-proof.

OBJECTS OF THE INVENTION

It is an object of the invention to provide novel compositions for imparting improved wash-resistant, dry-cleaning-resistant anti-static finishes on textile materials which finishes have a reduced tendency to gray.

It is another object of the invention to provide a novel method of making textile materials anti-static.

It is a further object of the invention to provide novel textile materials comprised at least partially of synthetic material having an anti-static finish.

These and other objects and advantages of the invention will become obvious from the following detailed description.

THE INVENTION

The novel condensation products of the invention are water-soluble or water-dispersible, hardenable condensation or resinous products having hydrogen atoms bonded to an amino nitrogen atom and halohydrin ether groups in a ratio of 1:0.6 to 1:1.5 and containing at least one lipophilic radical of 8 to 22 carbon atoms, said condensation product being formed by reacting at a temperature of about 50 to 120° C. (A) at least one compound selected from the group consisting of ammonia, primary monoamines and polyamines having at least 2 replaceable amino hydrogen atoms and (B) at least one compound selected from the group consisting of di- and/or poly halohydrin ethers of di- and polyalcohols of 2 to 6 carbon atoms and adducts thereof with 1 to 2 moles of a lower alkylene oxide, at least one of (A) and (B) being at least partially substituted with a polysiloxane radical and optionally being partially substituted with a lipophilic radical of 8 to 22 carbon atoms.

The said condensation products are applied in aqueous solutions or dispersions to textiles and then hardened to obtain textiles having an anti-static finish which is laundry-proof and dry-cleaning-proof.

The condensation products can be prepared in known manner by reacting the nitrogen compound of Group A with the halohydrin of Group B at elevated temperatures of 50 to 120° C. in the optional presence of water, organic solvents and acid binding agents, in the desired ratio.

To effect cross-linking during the condensation of the hardening step, specific relations of the number of reactive groups per molecule and components reacting with one another have to be adhered to (Flory, Principles of Polymer Chemistry, Chap. IX). Cross-linking will occur in the condensates of the invention, for example, when an amino compound having at least 2 reactive hydrogen atoms attached to a nitrogen atom per molecule is reacted with a halohydrin ether compound containing at least 3 halohydrin groups per molecule or when the ratio of the said reactants is reversed. Corresponding mono-functional compounds can be additionally used in the condensation provided the portion thereof is not greater than an equivalent amount of the poly-functional compound.

The degree of reaction is advantageously controlled by determining the amount of halogen ions formed in the reaction or by an increase in viscosity. The hardenable condensation product should have 20 to 90%, preferably 50 to 80% of amino hydrogen atoms and the halohydrin groups in the starting compounds reacted together. The reaction automatically terminates when the pH falls below 7 due to acid produced by the reaction or acid added thereto.

Examples of suitable nitrogen containing compounds for the condensation of the invention are ammonia; primary amines such as ethylamine, isopropylamine, cyclohexylamine, monoethanolamine, hydroxyethoxyethylamine, etc.; polyamines having at least two reactive hydrogen atoms attached to a nitrogen atom such as ethylenediamine, diethylenetriamine, dipropylenetriamine, triethylene tetraamine, 1,4-phenylene diamine, 1,4-diaminocyclohexane piperazine, polyethylene imines with a molecular weight of 150 to 3000 condensates of ammonia and/or amines with epichlorohydrin, condensates of tetraethylenepentaamine with 1 to 2 moles of ethylene oxide or propylene oxide, etc. The said nitrogen containing compounds can be admixed with secondary monoamines provided that the mixture contains an average of at least 1.5 reactive hydrogen atoms attached to a nitrogen atom per mole of reactant.

Examples of suitable halohydrin ether compounds for the condensation of the invention are di- and polyhalohydrin ethers of di- and polyalcohols of 2 to 6 carbon atoms such as di-, tri- and tetra-1,2-chlorohydrin ethers derived from 1,2-glycols, 1,3-glycols, glycerin, sugar alcohols, i.e., manite or sorbite, pentaerythrite, halohydrin ethers of adducts of 1 to 2 moles of a lower alkylene oxide such as ethylene oxide with the said alcohols. The halohydrin ethers may contain some monohalohydrin ethers derived from mono- or polyalcohols and these mixtures should contain an average of at least 1.5 halohydrin ether groups per mole of halohydrin ether compounds.

To introduce the lipophilic radical of at least 8 carbon atoms into the condensation products, at least one of the reaction components has to be partly or entirely substituted with such a radical or the introduction of the said radical can occur during the condensation step. Examples of suitable lipophilic radicals are aliphatic, aliphatic-cycloaliphatic and aliphatic-aromatic radicals having 8 to 22, preferably 12 to 18, carbon atoms and they may contain branch chains or double bonds, or be interrupted with oxygen or nitrogen atoms or be substituted with halogen such as flourine. The degree of substitution of lipophilic and polysiloxane radicals is 2 to 65%, preferably 6 to 30% by weight of the final condensation product.

Examples of suitable mono- or polyamines containing lipophilic radicals are dodecylamine, N-(hydroxyethoxyethyl)-hexadecylamine, N-stearyl-ethylenediamine, N,N'-didodecyldipropylenetriamine, tetraethylenepentaminestearic acid monoamide, N-acylamidoamines obtainable by aminolysis of natural fats with di- or polyamines, reaction products of fatty alcohol-1,2-chlorohydrinethers with mono-, di- or polyamines, addition products of acrylonitrile to primary amines containing lipophilic radicals and subsequent hydrogenation of the nitrile group; etherification products of aliphatic alcohols containing at least 8 carbon atoms with hydroxyalkylamines or polyamines.

Examples of halohydrin ethers containing lipophilic radicals are the bis-chlorohydrin ether of glycerinmonolauryl ether, bis-chlorohydrin ether of pentaerythritedicocoalkyl ether, chlorohydrin ether of dodecylalcohol, monochlorohydrin ether of 1,2-dihydroxydecane, etc.

The condensation products of the invention have the lipophilic radicals partially or entirely replaced with a polysiloxane radical having a molecular weight of about 250 to 1000. At least 10 mole percent, preferably 50 to 100 mole percent, of the lipophilic radicals are replaced by the polysiloxane radicals.

Particularly preferred for introducing the polysiloxane radicals during the condensation are dimethylpolysiloxanes having 5 to 10 or more silicon atoms and also containing groups such as 1,2-halohydrin and 1,2-halohydrin ether groups attached to silicon atoms through an alkylene or arylene radical and an amino or polyamino group containing replaceable amino hydrogen atoms. The said polysiloxanes can contain one or more reactive groups.

Suitable polysiloxane derivatives of this type are known and some are commercially available. They may be prepared by known methods such as by reaction of ammonia, amines or polyamines with known halo-, epoxy- or carboxyorganopolysiloxanes or by reaction of epihalohydrins, dihalohydrins or dihalohydrin ethers with hydroxy- or aminoorganopolysiloxanes, (Noll, Chemie und Technologie der Silikone, 1960, pp. 170–171).

The condensation products are applied from aqueous solutions in the usual manner in padding, dipping or spraying processes. About 0.3–5% by weight of the condensation product, based on the weight of the fibers, are applied onto the textile material.

Due to their excellent affinity for textile fibers, the products are preferably applied by exhaustion from a long liquor bath. They are readily absorbed at a relatively low temperature of 20°–100° C. preferably 40°– 70° C., by the textile fibers even without an addition of any auxiliary agents. The liquor ratio can amount to 1:8 to 1:100. If desired, the exhaustion behavior can be controlled by the addition of anionic or noninonogenic wetting agents. For padding or dipping-centrifuging processes or stretching process, the treatment liquor should contain sufficient amount of an acid acceptor to neutralize acid formed. Examples of suitable acid acceptors are alkali metal hydroxides, alkali metal carbonate or bicarbonate or salts of an inorganic base and organic acid, such as sodium acetate. The pH of the liquor containing the said acid acceptor should lie between 6 and 11. With regard to a stretching process, it is immaterial if the acid acceptor is added to the treatment liquor before or during the treatment or after the condensation product had been absorbed.

The condensation products of the invention are especially suitable for the treatment of synthetic or semi-synthetic textile materials made, for example, from polyamides, polyesters, polyacrylonitrile, polyvinylchloride, acetylcellulose, etc., alone or admixed with natural fibrous materials such as wool, silk or cellulose.

During drying of the treated textile materials, the condensation products are changed or hardened into a high molecular weight, water-insoluble condition. Drying may be effected at room temperature or up to usual drying temperatures, i.e., up to 200° C., used in the textile industry. The time required for hardening decreases in the same degree as the temperature increases.

In the following examples, there are described several preferred embodiments to illustrate the invention. However, it should be understood that the invention is not intended to be limited to the specific embodiments.

EXAMPLE I 318 gm. of diethyleneglycol were introduced into a flask equipped with a stirrer, a reflux condenser, a thermometer and a dropping funnel and 9 gm. of borontrifluorideacetic acid complex (36% $BF_3$) were added thereto with stirring. The mixture was heated to 70° C. and then 558 gm. of epichlorohydrin were added dropwise slowly enough that the reaction temperature could be kept between 68°–72° C. with moderate external cooling. Next, the reaction mixture was stirred for another 30 minute at about 70° C. and thereafter 32 gm. of tallow amine, 192 gm. of a linear dimethyl polysiloxane derivative having a terminal primary aminopropyl group, (molecular weight=about 1000), 91 gm. of 50% aqueous sodium hydroxide and 50 gm. of isopropanol were added to the reaction mixture. The mixture was then heated to 95° C. and stirred at this temperature for 60 minutes. After the reaction mixture had cooled to 80° C., 132 gm. of dipropylenetriamine, 1000 gm. of 50% aqueous isopropanol and 150 gm. of 50% aqueous sodium hydroxide were added thereto. Then the reaction mixture was stirred at 80°–83° C., until 62% of the organically bonded chlorine had become ionic. The pH was adjusted to below 5 by an addition of 450 gm. of 30% formic acid and the reaction mixture was cold-stirred to obtain a viscous condensation product which was easily soluble in water. A knitted fabric of textured polyester-endless yarn was treated in a winch vat with a bath liquor containing 1.5 gm. of the said condensation product, 1.5 gm. of sodium acetate and 0.2 gm. of sodium carbonate per liter with a liquor ratio of 1:30. The treatment lasted 20 minutes at a temperature of 60° C. and then the material was wrung out and dried at a temperature of 80°–100° C. The sample thus treated was subjected together with an untreated sample, to dry-cleaing with perchlorethylene and a commercial cleaning intensifying agent, together with suits in a commercial dry-cleaning plant. After cleaning, the treated sample showed a degree of 98.5% whiteness compared with the untreated sample. The dry cleaned sample as well as a correspondingly processed sample, washed at 40° C. 20 times with a commercial

EXAMPLE II 408 gm. of technically pure triethyleneglycol-bischlorohydrin ether were introduced into the apparatus described in Example I and then at a temperature of 70° C., 32 gm. of cocoamine, 20.4 gm. of the aminopropyl-dimethylpolysiloxane derivative used in Example I, 36.5 gm. of 50% aqueous sodium hydroxide and 20 gm. of isopropanol were successively added. The reaction mixture was then heated to 95° C., stirred at this temperature for 45 minutes and then cooled to 80° C. Thereafter, 53 gm. of dipropylenetriamine, 500 gm. of 50% aqueous isopropanol and 60 gm. of 50% aqueous sodium hydroxide were added thereto. The reaction mixture was heated to 85° C. and stirred until 57% of the organically bonded chlorine had ionized and finally, the pH was adjusted to below 5 with hydrochloric acid to obtain the condensation product.

Textured polyester-continuous yarn which had been dyed to a rose hue with a dispersion dye, was treated on crosswound bobbins in the dye apparatus with a bath liquor containing 1.5 gm. of the said condensation product, 1.5 gm. of sodium acetate and 0.2 gm. of sodium carbonate per liter of liquor. The liquor ratio was 1:20. After a treatment lasting 20 minutes, the yarn was squeezed dry at a temperature of 60° C. and then dried in the usual manner. The finished portion was used to knit the front of a pullover sweater, while the back of the sweater was knitted from an identically dyed, but untreated portion of the yarn. After both the front and the back had been sewn together, the pullover sweater was subjected to dry-cleaning with a batch of normally soiled knitted goods. After the cleaning, the finished front part showed no effect with regard to the color and it was not differentiated in appearance at all from the untreated back part.

EXAMPLE III

Using the apparatus and procedure of Example I, 8.5 gm. of diethyleneglycol bischlorohydrin ether were stirred together at a temperature of 70° C. with 25.5 gm. of the aminoppropyl-dimethylpolysiloxane derivative of Example I, 9.1 gm. of 50% aqueous sodium hydroxide and 5 gm. of 50% aqueous isopropanol. The mixture was reacted for 75 minutes at a temperature of 90° C. and then 13.2 gm. of dipropylenetriamine, 120 gm. of 50% aqueous isopropanol and 15 gm. of 50% aqueous sodium hydroxide were added at a temperature of 85° C. and the reaction mixture was stirred at 85° C. and until 63% of the organically bonded chorine had ionized. Then the pH was adjusted to 4.5 with acetic acid to obtain a clear, viscous solution. An undyed fabric from polyacrylonitrile fibers was treated on a padding apparatus with a liquor containing 100 gm. of the said condensation product, 20 gm. of sodium bicarbonate and 1 gm. of a non-ionic fatty alcohol polyglycol ether wetting agent per liter of liquor. Next, the fabric was squeeze dried to a liquor absorption of 40% by weight and then dried on a stretch frame at a temperature of 100°–120° C. The sample, together with an untreated sample, was subjected to dry-cleaning with perchloroethylene and a commerical cleaning intensifying agent together with suits in a commercial dry-cleaning plant. After the cleaning, the treated sample showed a whiteness degree of 102% compared with the untreated sample. The antistatic properties of the treated sample were very satisfactory after repeated cleaning as well as after washing 20 times with a commercial household detergent at a temperature of 40° C.

EXAMPLE IV 177 gm. of diethylene glycol-bischlorohydrin ether, 102 gm. of the aminopropyl-dimethylpolysiloxane derivative of Example I, 34.5 gm. of 50% aqueous sodium hydroxide and 20 gm. of 50% aqueous isopropanol were admixed at a temperature of 75° C. in the apparatus of Example I and stirred for 120 minutes at 97° C. Then at a temperature of 70° C., 21.2 gm. of diproylenetriamine, 400 gm. of 50% aqueous isopropanol and 20 gm. of 50% aqueous sodium hydroxide were added to the mixture, which was then reacted at 85° C. until 70% of the organically bonded chlorine had ionized and then the reaction mixture was adjusted to a pH of 5.2 with dilute formic acid to obtain the condensation product.

A fabric made from polyacrylonitrile fiber, which yellows in the presence of alkali, was processed in a padding apparatus with a bath liquor containing 120 gm. of the said condensation product and 13.5 gm. of sodium acetate per liter and adjusted to pH 6 with a 30% acetic acid. The fabric was squeeze dried to about 50% liquor absorption and dried on the stretching frame at a temperature of 120° C. No greying thereof was observed upon drycleaning in the presence of the usual cleaning agents and the antistatic effect proved to be resistant to dry-cleaning and to washing.

EXAMPLE V

A yarn of polyacrylonitrile yarn was padded on a yarn-dye apparatus (suspension system), bleached and then processed at a liquor ratio of 1:60 with an aqueous solution containing 0.7 gm. of the condensation product described in Example I and 0.3 gm. of sodium carbonate per liter of liquor. The treatment was effected over a period of 20 minutes at 60° C. Then the yarn was centrifuged without any intermediate rinsing and dried at 100°–120° C. in a suspension dryer. From the finished portion of yarn the front of a pullover sweater was knitted while the back of the sweater was knitted from an identical portion of untreated yarn. After the front and back had been sewn together, the sweater was drycleaned with a batch of suits. After the cleaning was finished, the processed front part showed no greying and was substantially uniform in appearance compared to the untreated back part.

EXAMPLE VI 235 gm. of a bis-chlorohydrin ether-polysiloxane derivative in the apparatus of Example I was reacted at a temperature of 85° C. with 9.6 gm. of di-hexamethylenetriamine, 600 gm. of 50% aqueous isopropanol and 10 gm. of 50% aqueous sodium hydroxide and then at a temperature of 90° C. until 55% of the organically bonded chlorine had ionized. Then the pH was adjusted to 4.5 with 60% acetic acid to obtain the condensation product.

Polyamide-carpet flake was dip-centrifiuged processed with a liquor containing 100 gm. of the said condensation product and 10 gm. of sodium bicarbonate per liter of liquor, centrifuged to a 30% liquor absorption and then dried in the usual manner. The sample was dry-cleaned together with an untreated sample after being sewn into a gauze bag with a batch of normally soiled suits. The processed sample showed, in comparison to the untreated sample, merely a hardly noticeable minimal greying, while the antistatic effect was satisfactory after dry-cleaning as well as after repeated wet-washing with a common household detergent.

The said bis-chlorohydrin-ether-polysiloxane derivative was obtained by an addition of 3 moles of ethylene oxide to 1 mole of a slightly branched dimethylpolysiloxane compound having 3–4 terminal primary hydroxypropyl groups and a molecular weight of about 2000 and subsequent reaction wth 2 moles of epichlorohydrin.

EXAMPLE VII

A cream-colored, highly padded polyacrylonitrile yarn was treated on a yarn-dye apparatus with an aqueous liquor in the liquor ratio of 1:60. The bath liquor contained 0.7 gm. of the condensation product of Example IV and 0.3 gm. of sodium carbonate per liter of solution and the processing was effected over a period of 20 minutes at a temperature of 60° C. Then the yarn was centrifuged without any intermediate rinsing and dried at 100°–120° C. in a suspension dryer. From the finished portion of the yarn, the front part of a pullover sweater was knitted, while the back part was knitted from an identical but untreated portion of the yarn. After the front and back had been sewn together, the pullover sweater was dry-cleaned with a batch of especially greatly soiled suits. After drycleaning, the treated sample showed a whiteness degree of 107%, based on the whiteness degree of the untreated sample and the treated parts of the pullover sweater still showed very good antistatic properties after the cleaning.

The following examples describe the preparation of additional condensation products which can be used in the same manner for the processing of textile materials.

EXAMPLE VIII

An amidopolyamine-organopolysiloxane derivative was prepared by reacting equimolar amounts of a linear dimethylpolysiloxane having a molecular weight of about 1000, and having a terminal carboxyalkyl group with dipropylenetriamine. 115 of the said amidopolyamine-organopolysiloxane derivative were mixed with 50 gm. of crude diethyleneglycol bischlorohydrin ether in the apparatus of Example I and the mixture was heated to 80° C. After an addition of 14 gm. of 50% aqueous sodium hydroxide and 350 gm. of 50% aqueous isopropanol, the mixture was stirred at 85° C. until 60% of the organically bonded chlorine had ionized. The reaction mixture was adjusted to a pH below 5 with acetic acid to obtain the condensation product.

EXAMPLE IX $\beta$-hydroxypropylpolyamine - dimethylpolysiloxane derivative was prepared by reacting molar amounts of a 1,2-epoxypropyl-dimethylpolysiloxane having a molecular weight of about 500 and triethylenetetramine. 65 gm. of the $\beta$-hydroxypropyl-polyamine-dimethylpolysiloxane derivative and 105 gm. of the bischlorohydrin ether adduct of 3 moles of ethylene oxide and 1 mole of glycerin were reacted in the apparatus of Example I in the presence of 24 gm. of 50% aqueous sodium hydroxide and 375 gm. of 50% aqueous isopropanol at a temperature of 95° C. until 55% of the organically bonded chlorine had ionized. Thereafter, the reaction mixture was adjusted to a pH 3.5 with 10% hydrochloric acid.

EXAMPLE X 88 gm. of ethylene oxide were added to 500 gm. of a linear, dimethylpolysiloxane derivative containing phenol groups and having a molecular weight of about 500 in a stirred autoclave. The adduct was then reacted with 93 gm. of epichlorohydrin and converted into the corresponding $\gamma$-chlorine-$\beta$-hydroxypropylether derivative. Next, 136.5 gm. of the resulting product were reacted with 26.4 gm. of dipropylenetriamine and 17 gm. of 50% aqueous sodium hydroxide and then 100 gm. of ethyleneglycol-bischlorohydrin ether in the presence of 400 gm. of 50% aqueous isopropanol and 40 gm. of 50% aqueous sodium hydroxide until 67% of the organically bonded chlorine had ionized. Finally, the reaction mixture was adjusted to a pH below 4.7 to obtain the condensation product.

EXAMPLE XI 170 gm. of triethyleneglycol-bischlorohydrin ether were reacted at a temperature of about 100° C. in a closed stirred autoclave with 25.5 gm. of the aminopropyl-dimethylpolysiloxane derivative of Example I, 20 gm. of 25% ammonium hydroxide and 50 gm. of 50% aqueous sodium hydroxide in the presence of 150 gm. of 50% aqueous isopropanol until 55% of the organically bonded chlorine had ionized. Then the reaction mixture was diluted with 10% acetic acid to obtain a slightly acid, very viscous condensation solution.

Various modifications of the products and method of the invention may be made without departing from the spirit or scope thereof.

We claim:
1. A hardenable condensation product having hydrogen atoms bonded to an amino nitrogen atom and halohydrin ether groups in a ratio of 1:0.6 to 1:1.5, said condensation product being formed by reacting at a temperature of 50 to 120° C. (A) at least one compound selected from the group consisting of ammonia, primary monoamines and polyamines having at least 2 replaceable amino hydrogen atoms and (B) at least one compound selected from the group consisting of di- and polyhalohydrin ethers of di- and polyalcohols of 2 to 6 carbon atoms and halohydrin ethers of adducts thereof with 1 to 2 moles of a lower alkylene oxide with said di- and polyalcohols, at least one of (A) other than ammonia and (B) being at least partially substituted with a linear dimethyl polysiloxane radical having 5 to 10 silicon atoms and containing at least one radical of 8 to 22 carbon atoms selected from the group consisting of aliphatic, cycloaliphatic and aliphatic aromatic which may contain double bonds, be interrupted with oxygen or nitrogen atoms and be substituted with halogen.

2. The product of claim 1 wherein the polysiloxane radical and the radical of 8 to 22 carbon atoms are 2 to 65% by weight of the condensation product.

3. The product of claim 2 wherein the polysiloxane radical and the radical of 8 to 22 carbon atoms are 6 to 30% by weight of the condensation product.

4. The product of claim 1 wherein 20 to 90% of the amino and halohydrin groups capable of being reacted have reacted.

5. The product of claim 1 wherein 50 to 80% of the amino and halohydrin groups capable of being reacted have reacted.

6. A method of imparting antistatic properties to synthetic textiles which comprises applying to synthetic textiles an aqueous alkaline solution of a hardenable condensation product of claim 1 and drying the textile.

7. Textiles treated by the method of claim 6.

References Cited

UNITED STATES PATENTS

| | | | |
|---|---|---|---|
| 3,108,011 | 10/1963 | Frotscher | 117—62.2 |
| 3,166,527 | 1/1965 | Ender | 260—33.2 |
| 3,247,280 | 4/1966 | Kanner | 260—824 |
| 3,347,803 | 10/1967 | Frotscher et al. | 260—2 |
| 3,384,599 | 5/1968 | Omietanski et al. | 252—352 |

FOREIGN PATENTS 956,363   4/1964   Great Britain.

DONALD E. CZAJA, Primary Examiner

M. T. MARQUIS, Assistant Examiner

U.S. Cl. X.R.

260—2, 824, 448.2; 117—139.5, 161